United States Patent [19]

Tsuchiya

[11] Patent Number: 4,740,684

[45] Date of Patent: Apr. 26, 1988

[54] STREAK CAMERA WITH REFRACTIVE LIGHT BEAM CONDITIONER

[75] Inventor: Yutaka Tsuchiya, Shizuoka, Japan

[73] Assignee: Hamamatsu Photonics K.K., Shizuoka, Japan

[21] Appl. No.: 901,524

[22] Filed: Aug. 28, 1986

[30] Foreign Application Priority Data

Aug. 30, 1985 [JP] Japan ................... 60-191234

[51] Int. Cl.$^4$ ............................. H01J 31/50
[52] U.S. Cl. ................ 250/213 VT; 313/524
[58] Field of Search ........... 250/213 VT, 368; 313/524–526, 528–530, 532, 542–544

[56] References Cited

U.S. PATENT DOCUMENTS 4,542,290 9/1985 Tan et al. ............... 250/213 VT
4,560,865 12/1985 Bergstrom ............... 250/213 VT
4,645,918 2/1987 Tsuchiya et al. ............... 313/528

Primary Examiner—Edward P. Westin
Attorney, Agent, or Firm—Finnegan, Henderson Farabow, Garrett & Dunner

[57] ABSTRACT

A streak camera for measuring light rays which vary at high speed comprises a refractive member for receiving and bending a light beam to a substantially slit-shaped form, and a streak tube assembly for forming a streak image representative of time variations of the slit-shaped beam supplied to the tube assembly from the refractive member. A glass rod with a unidirectional refractive index distribution is preferably used as the refractive member. The refractive index of the refractive member varies in parallel with the direction of deflection of the streak tube assembly.

14 Claims, 3 Drawing Sheets

STREAK CAMERA WITH REFRACTIVE LIGHT BEAM CONDITIONER

BACKGROUND OF THE INVENTION

1. Field of the Invention

This invention relates generally to image covertor cameras, and more particularly to electric streak cameras capable of measuring, for instance, temporal variation of intensity of a light emission phenomenon which varies at high speed.

2. Description of the Prior Art

The general arrangement of a conventional streak camera will be briefly described.

FIG. 6 is a sectional view of the conventional streak camera. A slit S1 is formed in the front end of a dark box B so that it extends perpendicular to the surface of the drawing. The image of a light beam to be measured, which has passed through the slit S1, is applied as a linear image to the photocathode Pd of the streak tube S through a lens $L_1$.

The streak tube S comprises the aforementioned photocathode Pd; a mesh electrode Me; a focusing electrode F; an aperture plate A; a deflecting electrode D; a microchannel plate M; and a phosphor screen Ph.

The electrons produced by the photocathode Pd are accelerated by the mesh electrode Me, focused by the focusing electrode F, and sent through the aperture A into the deflecting space defined by the deflecting electrode D, where the electrons thus treated are deflected.

The number of electrons thus deflected is multiplied by the micro-channel plate M and applied to the phosphor screen Ph. As a result, a streak image is formed on the phosphor screen Ph where electron images are aligned in order of its departure time from the photocathode; a time axis as a vertical axis. The image thus formed is projected by a lens $L_2$ onto the photocathode of an image pickup device which composes a streak image analyzing device.

The streak camera has variety of applications as it can record or measure light intensity which varies at high speed with high time resolution.

The time resolution of the streak camera is determined mainly by the characteristics of the streak tube S, the sweeping (or deflecting) speed of the streak camera, and the slit width.

An essential characteristic of the streak tube S is mainly the photoelectron transit time difference caused when photoelectrons travel from the photocathode Pd on the deflecting electrode D.

The time resolution $\Delta t$ of the streak camera can be expressed by the following equation:

$$\Delta t = ((\Delta t_1)^2 + (w/v)^2)^{\frac{1}{2}}$$

where $\Delta t_1$ is the transit time difference (s) determined by the characteristic of the streak tube S; v is the sweeping speed (m/s) on the phosphor screen Ph; and w is the full-width at half maximum of the slit image on the phosphor screen Ph provided when the sweeping of the streak tube S is suspended.

The typical values of the above data are as follows:

$$\Delta t_1 = 1.6 \text{ ps}, w = 60 \text{ } \mu\text{m}, \text{ and } v = 5 \times 10^7 \text{ m/s}.$$

In this case, the time resolution is approximately 2 ps.

$$\Delta t_1 = 5 \text{ ps}, w = 120 \text{ } \mu\text{m}, \text{ and } v = 1.5 \times 10^7 \text{ m/s}.$$

In this case, the time resolution is approximately 9.4 ps.

As is apparent from the above description, in order to obtain a time resolution on the order of the above-described values, it is necessary that the full-width at half maximum of the slit image on the phosphor screen Ph be set between 60 and 120 $\mu$m.

Therefore, in the case where the image magnification of the streak tube (magnifying the image of the photocathode on the fluorescent surface) is 1.5 to 3, it is necessary to form the slit image with a width of 10 to 30 $\mu$m on the photocathode of the streak tube.

As the resolution can be increased by decreasing the value w, a variety of methods of decreasing the width of a light beam applied to the photocathode Pd have been proposed.

In the case of FIG. 6, in order to obtain a narrow slit image on the photocathode, the light beam is passed through the incident slit S1, and the image of the incident slit S1 is formed on the photocathode by means of the relay lens $L_1$. In the measurement of extremely weak light such as the measurement of the waveform of a laser excitation fluorescence (or a light beam having large solid angle), it is necessary to collect as much light as possible to the incident slit. For this purpose, a method has been proposed in which, as shown in FIG. 7, a cylindrical lens $L_2$ is arranged in front of the slit S1 of the dark box B. In another method, as shown in FIG. 8, an optical fiber $L_3$ is used to lead the light beam to be measured to the incident slit S1 (FIG. 6) so that the width of the light beam is limited by the incident slit S1.

The above-described methods can limit the width of the light beam applied to the photocathode. However, these methods still have disadvantages. For example, since the slit is used, it is rather difficult for the streak camera to receive a sufficiently large quantity of input light.

Accordingly, it is an object of this invention to increase the concentration of light received by a streak camera for enhancing the quality of measurement.

Another object of the invention is to control the light beam to be measured in a streak camera in order to provide better resolution of the images produced.

A further object of the invention is to improve the application of a streak camera to a broader range of light intensities.

Additional objects and advantages will be obvious from the description, or may be learned by practice of the invention.

SUMMARY OF THE INVENTION

To achieve the foregoing objects and advantages, the streak camera of the present invention comprises refractive having a non-homogeneous refractive index means for receiving and bending a light beam to be measured into a substantially slit-shaped form, and streak tube means for forming a streak iamge representative of time variations of said slit-shaped beam supplied to said tube means from said refractive means.

Preferably the streak tube means includes photocathode means for receiving the slit-shaped beam and emitting electrons in response thereto, and the refractive means includes at least one refractive member for bending the light beam, and support means for supporting the refractive member in alignment with the photocathode means.

It is also preferred that the streak tube means include means for deflecting the electrons from the photocathode means, and that the refractive member have a refractive index which varies along a direction parallel to the direction of deflection of the deflecting means.

The refractive means may also include two refractive members aligned axially in series with the tube means.

It is preferred that the refractive member have a light nearly twice the focal length of the refractive member. In addition, optical fiber means may be provided for receiving the light beam and directing the beam into the refractive means.

Preferably, the refractive member includes a pair of opposing end faces, one of the end faces having an opening therein aligned with the axial direction of the streak tube means for receiving the light beam. The refractive member projects the slit-shaped beam onto the photocathode means from the opposite end face. The position and configuration of the opening may be adjustable. In addition, the camera may include collimator means for aligning the rays of the light beam in parallel before the beam is received by the refractive means.

The refractive means may include a transparent member having a unidirectional refractive index distribution, and is preferably a glass rod. An aperture board may also be include for controlling the light beam received by the refractive means.

Figure 4A:
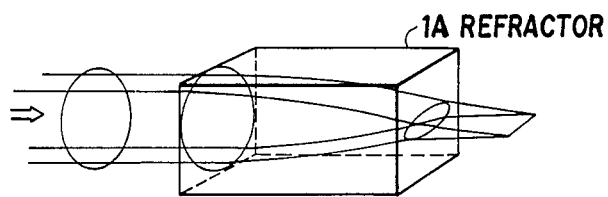
Figure 4B:
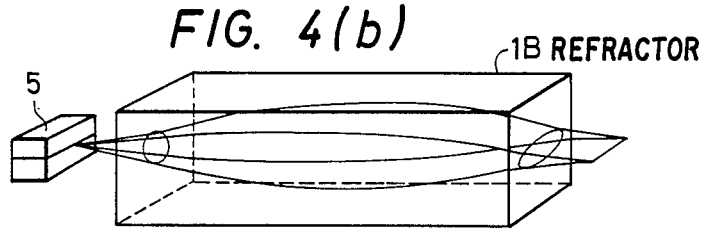
Figure 4C:
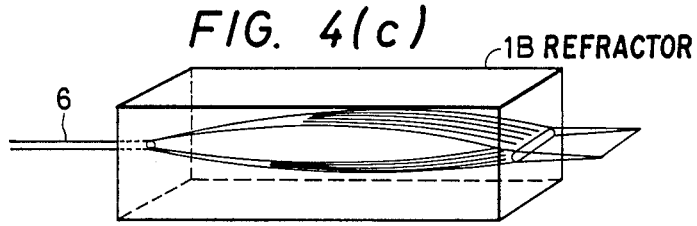

The parts (a) through (c) of FIG. 4 are perspective views showing examples of the glass rod in the streak camera according to the invention.

Figure 5:
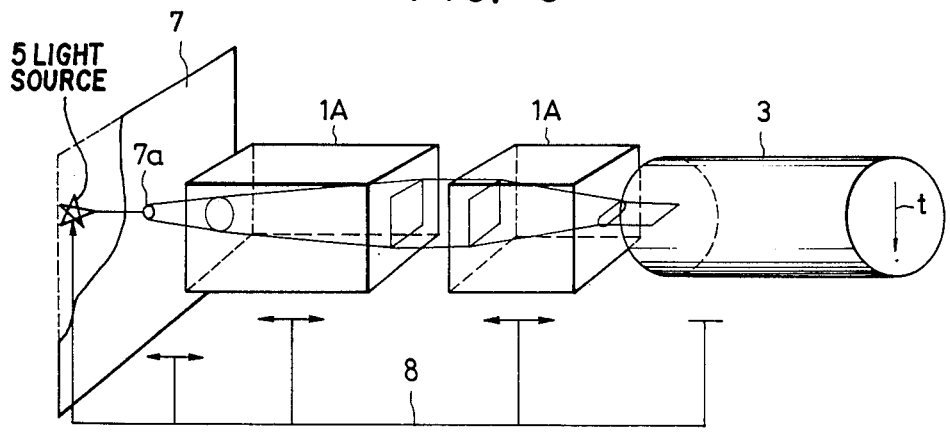

FIG. 5 is a perspective view showing another example of the streak camera according to the invention.

Figure 6:
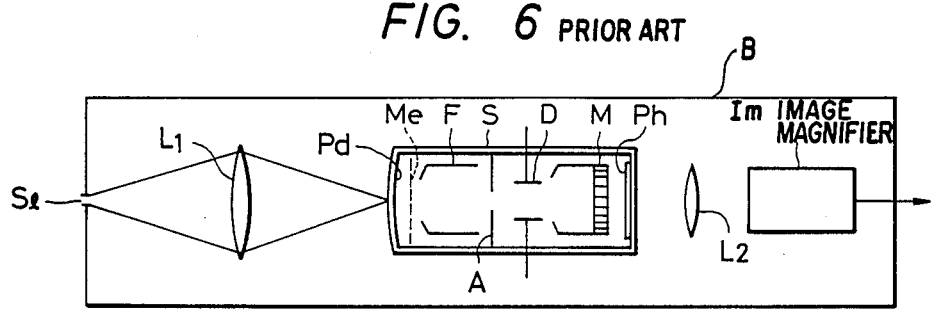

FIG. 6 is a sectional view for description of the fundamental arrangement and the operation of a conventional streak camera.

Figure 7:
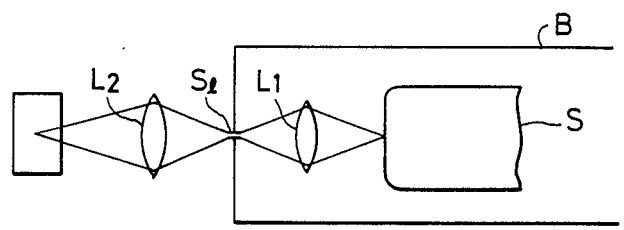

FIG. 7 is an explanatory diagram showing an arrangement for applying a light beam to be measured to the streak camera in such a manner that the light beam is in the form of a slit on the photocathode thereof.

Figure 8:
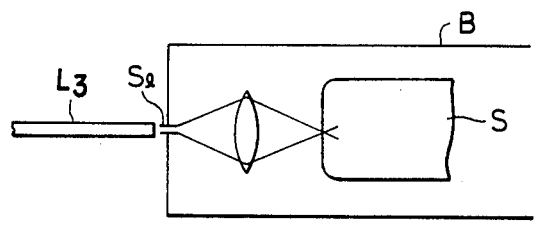

FIG. 8 is an explanatory diagram showing another arrangement for applying a light beam to be measured to the streak camera in such a manner that the light beam is in the form of a slit on the photocathode.

DESCRIPTION OF THE PREFERRED EMBODIMENT

Reference will now be made in detail to the present preferred embodiment of the invention, an example of which is illustrated in the accompanying drawings.

In accordance with the invention, the camera comprises refractive means for receiving and bending a light beam to a substantially slit-shaped form, and streak tube means for forming an image representative of time variations of the slit-shaped beam supplied to the tube means from the refractive means.

Figure 1:
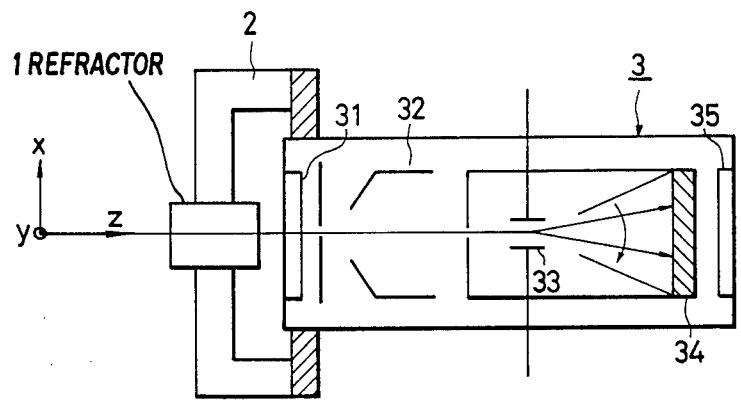
FIG. 1 is a sectional view of a fundamental example of a streak camera according to this invention.

FIG. 1 is a sectional view of a fundamental example of a streak camera according to this invention.

As embodied in FIG. 1, the refractive means includes a unidirectional refractive index distribution glass rod 1 supported by a glass rod supporting means 2 in such a manner that the rod is disposed in front of a streak tube 3.

The streak tube 3 comprises a photocathode 31, a focusing electrode 32, a deflecting electrode 33, a microchannel plate 34, and a phosphor screen 35. A light beam applied to the center of the photocathode 31 in such a manner that it is extended perpendicularly to the surface of the drawing is developed in the time axis direction of the phosphor screen to form a streak image. The optical characteristics of the unidirectional refractive index distribution glass rod 1 will be described below.

Figure 2:
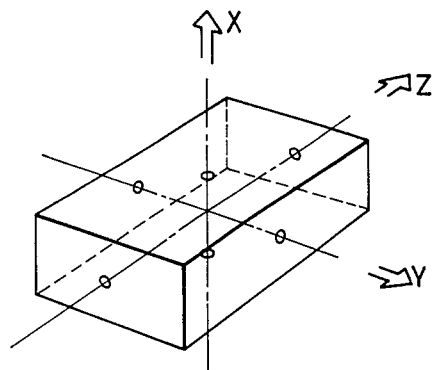
FIG. 2 is a perspective view of a glass rod for a description of the fundamental characteristics of the glass rod.
Figure 3:
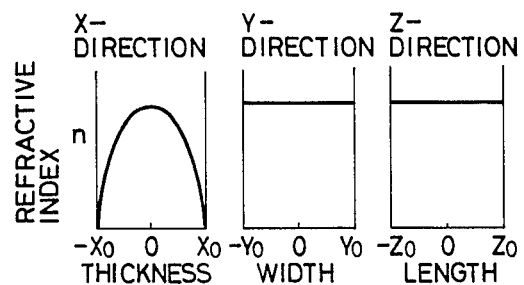
FIG. 3 is a graphical representation indicating the refractive index distributions of the glass rod.

FIG. 2 is a perspective view of the glass rod of the invention, and FIG. 3 shows the refractive index distributions of the glass rod.

The unidirectional refractive index distribution glass rod 1 is, in general, in the form of a slab, as shown in FIG. 2. The glass rod 1 is attached to the streak tube 3 by the aforementioned supporting means 2 in such a manner that the X-axis of FIG. 2 is coincident with the electric field direction of the deflecting electrode 33 of the streak tube 3, and the Z-axis is coincident with the axial direction of the streak tube 3.

The refractive index distribution of the unidirectional refractive index distribution glass rod is such that the refractive index is smaller towards the outer sides ($X_0$ and $-X_0$) from the center according to the following equation:

$$n(X)^2 = n_0^2(1 - g^2 X^2)$$

where $n_0$ is the refractive index in the Z-Y plane, $n(X)$ is the refractive index in the direction of thickness (X), and g is the constant representative of the refractive index gradient.

The parts (a) through (c) of FIG. 4 are perspective views of examples of the glass rod in the streak camera according to the invention.

In the part (a) of FIG. 4, a light beam to be measured is applied to the incident end face of the undirectional refractive index distribution glass rod 1A in such a manner that it is perpendicular to the incident end face. The beam is converted into a slit-shaped light beam.

Hereinafter, the length in the Z-direction required for focusing the rays on the YZ plane of FIG. 2 which are perpendicular to the incident end face of the glass rod and different in position in the X-direction, will be referred to as "a focus length", when applicable.

In the unidirectional refractive index distribution glass rod shown in part (a) of FIG. 4, the length in the Z-direction is slightly shorter than the focus length.

The rays focused in the Z-axis direction inside of the unidirectional refractive index distribution glass rod 1A, after emerging from the emergent end face, are collected in the form of a slit. At the point where the rays are collected in this manner, the photocathode 31 of the streak tube 3 is positioned. More specifically, the glass rod 1A is so supported by the supporting means 2 that the rays are collected in the form of a slit at the photocathode 31.

It is preferable that the light beam to be measured be converted into a parallel light beam by a collimator optical system before being applied to the incident end face.

In a unidirectional refractive index distribution glass rod 1B shown in the part (b) of FIG. 4, the length in the Z-direction is slightly smaller than twice the focus length.

The light rays from a light source 5 which are applied, with a certain solid angle, to the incident end face of the unidirectional refractive index distribution glass rod 1B are converted into parallel light rays inside of the glass rod, and are focussed in a manner similar to the above-described glass rod 1A. The parallel light rays, after emerging from the emergent end face, are collected in the form of a slit.

In a unidirectional refractive index distribution glass rod 1B shown in part (c) of FIG. 4, similar to part (b) of FIG. 4, the length in the Z-direction is slightly smaller than twice the focus length.

The light rays applied through an optical fiber 6 to the incident end face of the unidirectional refractive index distribution glass rod 1B are spread once, as is well known in the art, and are then focussed. The light rays thus focussed, after emerging from the emergent end face, are collected in the form of a slit.

FIG. 5 is an explanatory diagram showing another example of the streak camera according to the invention.

In the example of FIG. 5, an aperture board 7 having an opening 7a is used to receive light rays from a light source 5 to be measured. The streak camera further comprises a pair of unidirectional refractive index distribution glass rods 1A and 1A. The light rays from the light source 5 are converted into parallel light rays by one of the glass rods 1A, and the parallel light rays are focused by the other glass rods 1A. The parallel light rays thus focused, after emerging from the emergent end face, are collected in the form of a slit. The positions in the Z-direction (or the axial direction of the streak tube 3) of the components are adjusted by adjusting means 8 so that the position where the light rays are collected, as described above, is coincident with the position of the photocathode 31 of the streak tube 3.

As the wavelength of incident light changes, the refractive index of the glass rod also changes. Therefore, depending on the kind of a light source 5 to be measured, it is necessary to adjust the distance between the streak tube 3 and the glass rod 1A and the distance between the light source 5 and the streak tube 3. This adjustment provides a light beam in the form of a thinner slit on the photocathode 31 of the streak tube 3.

The light beam in the form of a slit is converted by the streak tube 3 into a streak image which is developed in the time axis direction of the phosphor screen of the streak tube 3.

A plurality of aperture boards 7 having openings of different configurations also may be provided. These boards can be selectively used according to the kinds of light sources to be measured.

The streak images formed by the above-described streak cameras are recorded and analyzed by a recording device which is well known in the art. For example, the streak image can be recorded and analyzed by using an image pickup device. The present inventor has described various apparatus for analyzing streak images with an image pickup device in Japanese Patent Application Publication No's 44622/1981, 40709/1982, and 40712/1982.

In the case where the light source to be measured is extremely low in intensity and emits light periodically, the repetitive image can be measured by accumulating the light in a time division mode. Such measuring devices have been proposed by the inventor in Japanese Patent application "OPI" No's 104519/1984, 134538/1984, and 135330/1984 (the term "OPI" as used herein meaning an "unexamined published application"). The streak tubes in these devices can be utilized in a similar manner to the above-described streak tube.

As was described above in detail, the streak camera of the invention is so designed that the unidirectional refractive index distribution glass rod, the refractive index of which changes in the direction of deflection of the streak tube, is arranged in front of the streak tube, and the light beam applied to one of the end faces of the glass rod is further applied to the photocathode of the streak tube in the form of a slit.

Therefore, a slit-shaped optical image can be readily formed on the photocathode of the streak tube by the unidirectional refractive index distribution glass rod. The unidirectional refractive index distribution glass rod also can increase the range of application of the light bean to be measured. urthermore, additional use of various adjusting means permits the streak camera to receive a light beam in the form of a thinner slit without greatly limiting the incident light beam. This improves the resolution of the streak camera.

Various modification and variations could be made in the invention without departing from the scope or spirit of the invention.

I claim:

1. A streak camera for measuring light rays which vary at high speed, comprising:
   refractive means having a non-homogeneous refractive index for receiving and bending a light beam to a substantially slit-shaped form; and
   streak tube means for forming a streak image representative of time variations of said slit-shaped beam supplied to said tube means from said refractive means.

2. The camera of claim 1 wherein said streak tube means includes photocathode means for receiving said slit-shaped beam and emitting electrons in response thereto, and said refractive means includes at least one refractive member for bending said light beam, and support means for supporting said refractive member in alignment with said photocathode means.

3. The camera of claim 2 wherein said streak tube means includes means for deflecting the electrons from said photocathode means, and said refractive member has a refractive index which varies along a direction parallel to the direction of deflection of said deflecting means.

4. The camera of claim 2 wherein said refractive means includes two refractive members aligned axially in series with said tube means.

5. The camera of claim 2 wherein said refractive member has a length nearly twice the focal length of said refractive member.

6. The camera of any of claims 1, 2, 3, 4 or 5 also including optical fiber means for receiving said light beam and directing said beam into said refractive means.

7. The camera of claim 2 wherein said refractive member includes a pair of opposing end faces, one of said end faces having an opening therein aligned with the axial direction of said streak tube means for receiving said light beam, said refractive member projecting the slit-shaped beam onto said photocathode means from said opposite end face.

8. The camera of claim 1 wherein the position and configuration of said opening are adjustable.

9. The camera of claim 1 also including collimator means for aligning the rays of said light beam in parallel before said rays are received by said refractive means.

10. The camera of claim 1 wherein said refractive means includes a transparent member.

11. The camera of claim 10 wherein said transparent member has a unidirectional refractive index distribution.

12. The camera of claim 11 wherein said transparent member is a glass rod.

13. The camera of claim 1 also including at least one aperture board arranged for controlling the light beam received by said refractive means.

14. The streak camera of claim 3 wherein said refractive means is a rectangular prism of transparent material having three orthogonal axes, x, y, and z located perpendicular to the center of each parallel set of face planes of said refractive means, said z axis located coincident to the central axis of said streak tube means and said x axis located parallel to the electric field direction of said deflecting means, said refractive index of said refractive means varying in the x direction according to the equation:

$$n(x)^2 = n_0^2(1 - g^2 x^2)$$

where $n_0$ is the refractive index in the z-y plane, $n(x)$ is the refractive index in the x direction, and g is the refractive index gradient.

* * * * *